United States Patent
Tamura et al.

(10) Patent No.: US 9,602,803 B2
(45) Date of Patent: Mar. 21, 2017

(54) INFORMATION PROCESSOR

(71) Applicant: Sony Computer Entertainment Inc., Tokyo (JP)

(72) Inventors: Keigo Tamura, Tokyo (JP); Tomohiro Ogawa, Tokyo (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 226 days.

(21) Appl. No.: 14/509,281

(22) Filed: Oct. 8, 2014

(65) Prior Publication Data

US 2015/0124053 A1    May 7, 2015

(30) Foreign Application Priority Data

Nov. 7, 2013  (JP) .................... 2013-231103

(51) Int. Cl.
| | | |
|---|---|---|
| *H04N 13/02* | (2006.01) | |
| *G06K 9/00* | (2006.01) | |
| *A63F 13/213* | (2014.01) | |
| *A63F 13/79* | (2014.01) | |

(52) U.S. Cl.
CPC ....... *H04N 13/0203* (2013.01); *A63F 13/213* (2014.09); *A63F 13/79* (2014.09); *G06K 9/00228* (2013.01); *G06K 9/00912* (2013.01)

(58) Field of Classification Search
CPC ........... G06K 9/00228; G06K 9/00912; H04N 13/0203; A63F 13/79; A63F 13/213
USPC .......................................................... 348/46
See application file for complete search history.

(56) References Cited

U.S. PATENT DOCUMENTS

| | | | | |
|---|---|---|---|---|
| 2002/0152390 A1* | 10/2002 | Furuyama | ........... | G06F 17/3025 713/185 |
| 2003/0185424 A1* | 10/2003 | Sato | .................. | G06K 9/00255 382/118 |
| 2007/0110305 A1* | 5/2007 | Corcoran | ........... | G06K 9/00228 382/167 |
| 2010/0067751 A1 | 3/2010 | Aoki | | |

FOREIGN PATENT DOCUMENTS

| | | |
|---|---|---|
| JP | 2001-256496 | 9/2001 |
| JP | 2003-141541 | 5/2003 |
| JP | 2003-317100 | 11/2003 |
| JP | 2004-157771 | 6/2004 |

(Continued)

OTHER PUBLICATIONS

Speir (Face Verification Visionics Corp.'s FaceIt).*

(Continued)

*Primary Examiner* — William Tran
(74) *Attorney, Agent, or Firm* — Katten Muchin Rosenman LLP

(57) ABSTRACT

Disclosed herein is an information processor configured to register user face identification data, the information processor including: a captured image display section adapted to display part of a captured image on a display; a guidance display section adapted to display, on the display, guidance prompting a user to rotate his or her face relative to an imaging device; and a registration processing section adapted to register face identification data based on user's face image included in the captured image after or while the guidance is displayed.

10 Claims, 15 Drawing Sheets

(56) References Cited

FOREIGN PATENT DOCUMENTS

JP    2007-048113    2/2007

OTHER PUBLICATIONS

Sukegawa (English Translation of Japanese Publication 2001-256496).*
Notification of Reason for Refusal dated Aug. 18, 2015 from corresponding Application No. 2013-231103.

* cited by examiner

REGISTER FACE IDENTIFICATION DATA

FACE IDENTIFICATION DATA HAS BEEN ADDED.

WHEN THE INFORMATION PROCESSOR IS TURNED ON THE NEXT TIME, YOU WILL BE ABLE TO LOG INTO THE INFORMATION PROCESSOR BY SIMPLY SHOWING YOUR FACE TO THE CAMERA.

OK

◎ SELECT

INFORMATION PROCESSOR

BACKGROUND

The present disclosure relates to an information processor configured to register face identification data that is used to recognize user's face.

When a user logs into an information processor of a game console, the information processor performs a user authentication process to identify whether the user attempting to log in is registered in advance. Users can be authenticated in a variety of ways. User authentication using a password is widely popular.

SUMMARY

In addition to user authentication using a password, user authentication using user's biological information is also common. With user authentication using user's biological information, it is not necessary for a user to enter any password, thus saving user's time and energy. With a face authentication system designed to recognize user's face from a digital image in particular, it is basically not necessary for a user to perform any special action, making the system known as a simple and easy user authentication method. The present inventor has focused on the ease with which user authentication can be achieved using a face authentication system and has conceived a user interface to efficiently register face identification data for face authentication.

In light of the foregoing, it is desirable to provide a technology adapted to register face identification data.

According to an embodiment of the present disclosure, there is provided an information processor configured to register user face identification data. The information processor includes a captured image display section, a guidance display section, and a registration processing section. The captured image display section displays part of a captured image on a display. The guidance display section displays, on the display, guidance prompting a user to rotate his or her face relative to an imaging device. The registration processing section registers face identification data based on user's face image included in the captured image after or while the guidance is displayed.

It should be noted that any combinations of the above components and any conversions of expressions of the present disclosure between "method," "device," "system," "recording media," "computer program," and so on are also effective as modes of the present disclosure.

The information processing technology according to the present disclosure provides a technology adapted to efficiently register face identification data.

BRIEF DESCRIPTION OF THE DRAWINGS

FIG. 15 is a diagram illustrating an end screen of a face registration process.

DETAILED DESCRIPTION OF THE PREFERRED EMBODIMENT

Figure 1:
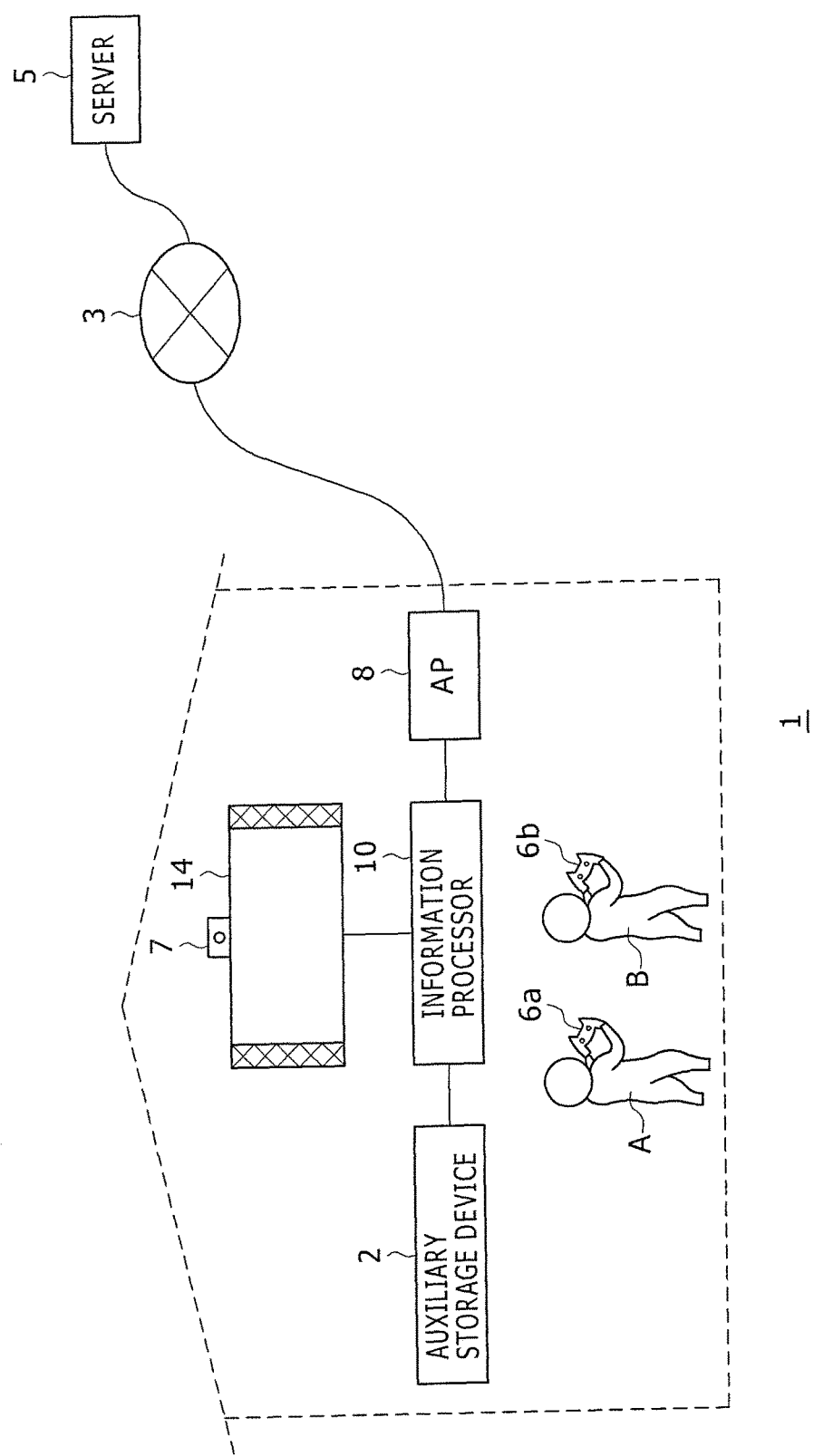
FIG. 1 is a diagram illustrating an information processing system according to an embodiment of the present disclosure.

FIG. 1 illustrates an information processing system 1 according to an embodiment of the present disclosure.

The information processing system 1 includes an information processor 10 and a server 5. The information processor 10 is a user terminal. An access point (hereinafter referred to as an AP) 8 has wireless access point and router functions. The information processor 10 is connected to the AP 8 in a wireless or wired manner so as to connect to the server 5 on a network 3 in a communicatable manner.

An auxiliary storage device 2 is a large-capacity storage device such as HDD (Hard Disk Drive) or flash memory. The auxiliary storage device 2 may be an external storage device adapted to connect to the information processor 10, for example, by USB (Universal Serial Bus). Alternatively, auxiliary storage device 2 may be a built-in storage device. An output device 4 may be a television set having a display adapted to output an image and a speaker adapted to output sounds. Alternatively, the output device 4 may be a computer display. The output device 4 may be connected to the information processor 10 with a cable or wirelessly. The information processor 10 is connected to an input device 6 in a wireless or wired manner. The input device 6 is operated by a user. The input device 6 outputs an operation signal indicating the user operation result to the information processor 10. Upon receipt of the operation signal from the input device 6, the information processor 10 reflects the operation signal on the processing of the OS (Operating System, i.e. system software) or an application, causing the processing result to be output from the output device 4. The input device 6 includes a plurality of input sections such as a plurality of push-type operation buttons, direction keys, analog sticks that permit entry of an analog amount, and rotary buttons.

Upon receipt of an operation signal from the input device 6, the information processor 10 reflects the operation signal on the processing of an application, causing the processing result to be output from the output device 4. In the information processing system 1, the information processor 10 is a game console adapted to execute a game, and the input device 6 is a game controller or other device adapted to supply a user operation signal to the information processor 10. It should be noted that the input device 6 may be an input interface such as keyboard or mouse. A camera 7, an imaging device, is provided near the output device 4 and captures an image of the space around the output device 4. FIG. 1 illustrates an example in which the camera 7 is attached to the upper portion of the output device 4. However, the camera 7 may be arranged on the side or lower portion of the output device 4. In any case, the camera 7 is arranged where it can capture an image of the user in front of the output device 4. The camera 7 may be a stereo camera.

The server 5 provides network services to users of the information processing system 1. The server 5 manages network accounts each of which identifies each user. Each user signs in to the network services provided by the server 5 using a network account. The users can register saved game data and trophies, virtual items of commendation received during playing of the game, in the server 5 by signing in to the network services from the information processor 10.

FIG. 1 illustrates that two users A and B operate input devices 6a and 6b, game controllers. The users A and B can enjoy applications such as games by operating the input devices 6a and 6b respectively and entering their login passcodes to be authenticated by the information processor 10 and then logging into the OS of the information processor 10.

In recent years, games have come along that reflect user motion on game character motion. In a game using user's gesture, it is not necessary for the user to hold the input device 6, and the user can intuitively move characters. In such a game, the user does not use the input device 6 in the first place. Therefore, when the user logs into the OS of the information processor 10, the user should preferably be authenticated without using the input device 6. It should be noted that the fact that the user can log in through a simple and easy user authentication procedure irrespective of the type of game the user will play after logging in is meaningful for the information processing system 1.

For this reason, the information processing system 1 according to the present embodiment provides a technology that permits user authentication in a simple and easy manner through a face recognition process using an image captured by the camera 7.

Figure 2:
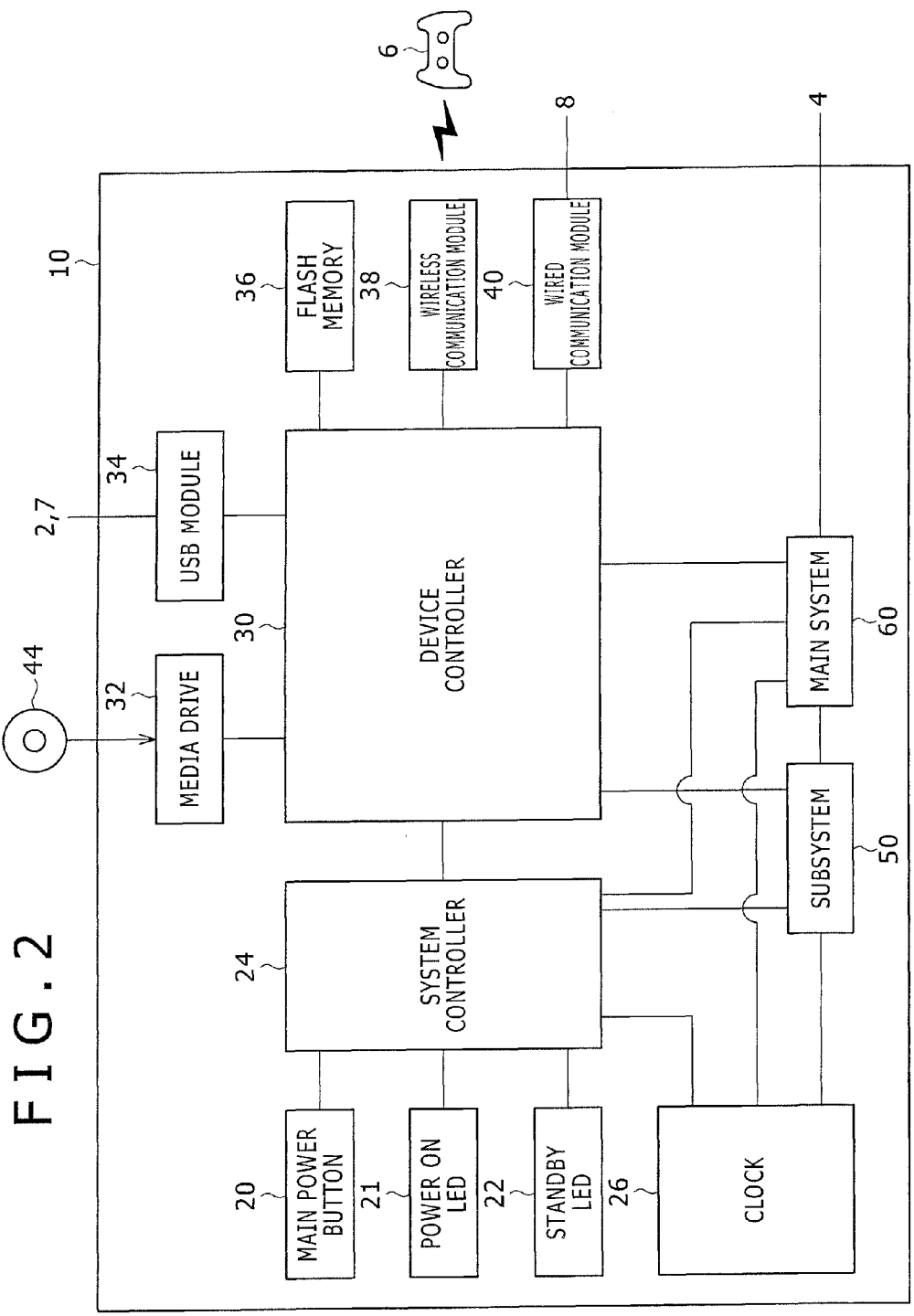
FIG. 2 is a diagram illustrating functional blocks of an information processor.

FIG. 2 illustrates functional blocks of the information processor 10. The information processor 10 includes a main power button 20, a power ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes, for example, a main CPU (Central Processing Unit), a memory, a memory controller, and a GPU (Graphics Processing Unit). The memory is a main storage device. The GPU is primarily used to handle arithmetic operations of game programs. These functions may be integrated into a single system-on-chip. The main CPU has a function to start the OS and execute the applications installed in the auxiliary storage device 2 under the environment supplied by the OS.

The subsystem 50 includes a sub-CPU, a memory which is the main storage device, a memory controller, and so on, but does not include any GPU. The sub-CPU has fewer circuit gates than the main CPU, and consumes less power for operation than the main CPU. The sub-CPU is designed to operate when the main CPU is on standby. Therefore, the sub-CPU has limited processing capability to reduce its power consumption. It should be noted that the sub-CPU and the memory may be formed into separate chips.

The main power button 20 is an input section from which an operation input is made by the user. The main power button 20 is provided on the front face of the enclosure of the information processor 10 and operated to turn ON or OFF the power for the main system 60 of the information processor 10. Hereinafter, the term "the main power is ON" will mean that the main system 60 is active, and the term "the main power is OFF" will mean that the main system 60 is on standby. The power ON LED 21 lights up when the main power button 20 is switched ON, whereas the standby LED 22 lights up when the main power button 20 is switched OFF.

The system controller 24 detects the pressing of the main power button 20 by the user. If the main power button 20 is pressed when the main power is OFF, the system controller 24 acquires the pressing of the button as a "switch-ON instruction." On the other hand, if the main power button 20 is pressed when the main power is ON, the system controller 24 acquires the pressing of the button as a "switch-OFF instruction."

The main CPU has a function to execute the game programs installed in the auxiliary storage device 2 and a ROM (Read Only Memory) medium 44. This is not the case with the sub-CPU. However, the sub-CPU has a function to access the auxiliary storage device 2 and exchange data with the server 5. The sub-CPU has only these limited processing capabilities, making it less power consuming for operation than the main CPU. These functions of the sub-CPU are delivered when the main CPU is on standby. In the information processor 10 of the present embodiment, the subsystem 50 is active when the main system 60 is on standby. As a result, the information processor 10 is maintained in a condition in which it is typically signed in to the services provided by the server 5.

The clock 26 is a realtime clock, generating current date and time information and supplying this information to the system controller 24, the subsystem 50, and the main system 60.

The device controller 30 is an LSI (Large-Scale Integrated Circuit) that handles exchange of information between devices as does a south bridge. As illustrated in FIG. 2, various devices are connected to the device controller 30. Such devices include the system controller 24, the media drive 32, the USB module 34, the flash memory 36, the wireless communication module 38, the wired communication module 40, the subsystem 50, and the main system 60. The device controller 30 accommodates the differences in electrical characteristics and data transfer speed between the devices, thus controlling data transfer timings.

The media drive 32 is a drive device adapted to drive the inserted ROM medium 44 that stores application software such as game and license information and read the program and data from the ROM medium 44. The ROM medium 44 is a read-only recording media such as optical disc, magneto-optical disc, or Blu-ray disc.

The USB module 34 connects to an external device via a USB cable. The USB module 34 may connect to the auxiliary storage device 2 and the camera 7 via USB cables. The flash memory 36 is an auxiliary storage device that makes up an internal storage. The wireless communication module 38 communicates wirelessly, for example, with the input device 6 through a communication protocol such as Bluetooth (registered trademark) protocol or IEEE 802.11 protocol. It should be noted that the wireless communication module 38 may support the 3rd generation digital cell phone system that is compatible with the IMT-2000 (International Mobile Telecommunication 2000) defined by the ITU (International Telecommunication Union). Further, the wireless communication module 38 may support the digital cell phone system of other generation. The wired communication module 40 communicates with external devices in a wired manner to connect, for example, to the network 3 via the AP 8.

In the information processing system 1 of the present embodiment, if the main power button 20 is pressed by a user when the main power is OFF, the information processor 10 turns ON the main power and starts the OS (system software), performing the login process of the user who does not use the input device 6. In this login process, the information processor 10 serves as a face authentication system using an image captured by the camera 7.

Figure 3:
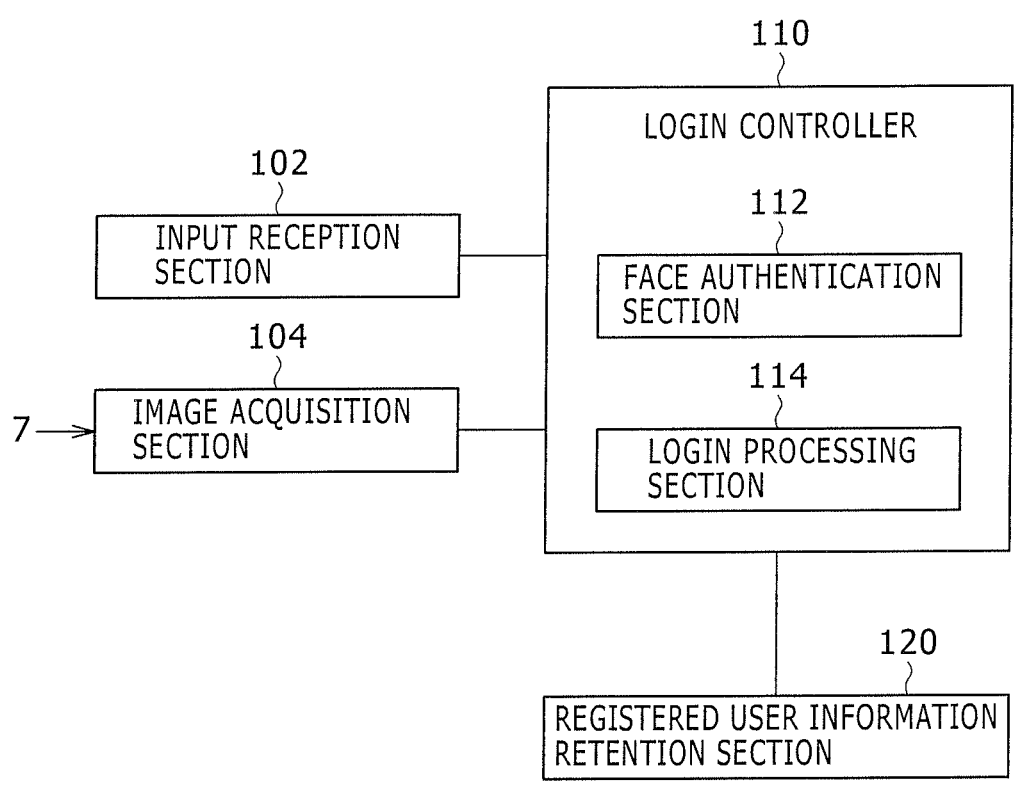
FIG. 3 is a diagram illustrating a configuration adapted to implement a face authentication function of the information processor.

FIG. 3 illustrates a configuration adapted to implement a face authentication function of the information processor 10. The information processor 10 includes an input reception section 102, an image acquisition section 104, a login controller 110, and a registered user information retention section 120. The login controller 110 includes a face authentication section 112 and a login processing section 114. The input reception section 102 receives operation information from the user. The image acquisition section 104 acquires an image captured by the camera 7. The camera 7 captures a spatial image at predetermined intervals and captures, for example, a spatial image every 1/30 of a second, supplying the captured image to the image acquisition section 104. The camera 7 is arranged in such a manner that the optical axis thereof faces forward of the output device 4. As a result, the camera 7 images the user in front of the output device 4.

In FIG. 3, each of the components described as a functional block adapted to handle various processes can be implemented, in terms of hardware, by a circuit block, a memory, or other LSI, and, in terms of software, for example, by a program loaded into a memory. Therefore, it is understood by those skilled in the art that these functional blocks can be implemented in various ways by hardware alone, software alone, or a combination thereof and that the present disclosure is not limited to any one of them.

The information processor 10 of the present embodiment supports simple and easy login by the user. It is necessary for the user to acquire a user account in advance and register the account in the information processor 10 so as to log into the OS of the information processor 10. A user whose account is registered in the information processor 10 will be hereinafter referred to as a "registered user."

The registered user information retention section 120 retains a variety of information about a registered user and, more specifically, retains, for example, face identification data, user online ID (Identification Data, i.e. network nickname), login passcode, and so on as registered user information in association with a user account. Here, face identification data is feature data of face images of a registered user. However, face identification data may be face image data itself. Face identification data is data to be compared against in the face recognition process performed by the face authentication section 112. Face identification data is generated according to the face recognition algorithm used by the face authentication section 112. For example, face identification data may be extracted features such as relative positions and sizes of facial parts, and shapes of eyes, nose, cheekbones, and chin. Further, face identification data may be difference data extracted from standard face image data. The type of face identification data to be extracted is determined by the face recognition algorithm to be used. In the present embodiment, the face authentication section 112 uses a known face recognition algorithm. A description will be given later of the face identification data registration process.

A description will be given below of the process performed when a registered user logs into the OS of the information processor 10. In this login process, the user logs in without using the input device 6.

When the user presses the main power button 20 of the information processor 10, the main power for the information processor 10 is turned ON. As a result, the input reception section 102 receives information indicating the pressing of the main power button 20 as a login request from the user. When the input reception section 102 receives a login request, the functions of the login controller 110 are implemented. The login controller 110 has a function to determine whether to permit or deny the login of the user based on the user's face recognition result.

When the input reception section 102 receives a login request based on the pressing of the main power button 20, the face authentication section 112 extracts the area of the image captured by the camera 7 which is likely a person's face and derives feature data of that area. Next, the face authentication section 112 compares the derived feature data against the face identification data retained by the registered user information retention section 120, determining whether the extracted face is the face of a registered user.

More specifically, the face authentication section 112 derives the level of match between the feature data of the extracted user's face image and the face identification data of all the registered users retained by the registered user information retention section 120. This level of match is numerically represented and derived, for example, as how many points out of a maximum of 100 points. If the level of match with the feature data of the registered face image exceeds 90 points, the face authentication section 112 determines that the imaged user is registered and identifies which registered user the imaged user is. It should be noted that if two or more pieces of the face identification data exceed 90 points in level of match, it is only necessary for the face authentication section 112 to determine that the imaged user is the registered user whose face identification data has derived the highest score. It should be noted that if there is no piece of the face identification data that exceeds 90 points in level of match as a result of deriving the level of match between the feature data of the extracted user's face image and the face identification data of all the registered users, the face authentication section 112 determines that the user included in the captured image is not registered. As described above, the face authentication section 112 detects the face image of a registered user existing in a captured image using face identification data retained by the registered user information retention section 120. This face identification process may employ any known technology.

After determining that the image user is registered and identifying the registered user, the face authentication section 112 notifies the login processing section 114 of user identification information of the registered user. As a result, the login processing section 114 allows the registered user to log into the information processor 10. As described above, the information processor 10 of the present embodiment implements a simple and easy login process without using the input device 6.

Although the login process through face recognition has been described above, it is necessary for the registered user information retention section 120 to retain face identification data in advance so as to perform this login process. When generating a new user account, the user specifies a login passcode that will be entered during login using the input device 6. At this time, the user also registers face identification data. It should be noted that if it is not necessary to register face identification data when a new user account is generated, a registered user whose face identification data has yet to be registered may register his or her face identification data after having logged into the OS. A description will be given below of the registration of face identification data in the registered user information retention section 120.

Figure 4:
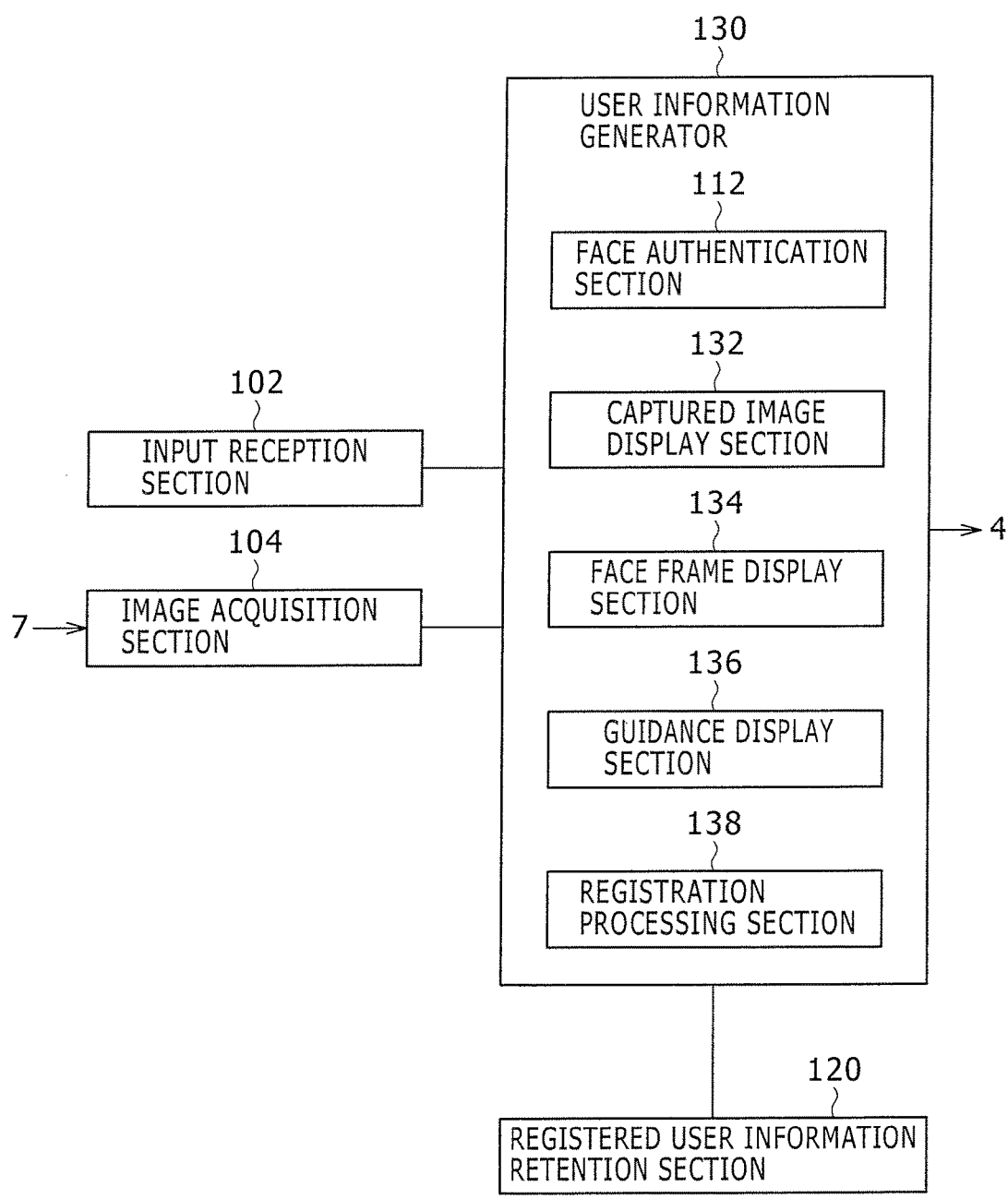
FIG. 4 is a diagram illustrating a configuration adapted to implement a face registration function of the information processor.

FIG. 4 illustrates a configuration adapted to implement a face registration function of the information processor 10. The information processor 10 includes the input reception section 102, the image acquisition section 104, and a user information generator 130. The user information generator 130 includes the face authentication section 112, a captured image display section 132, a face frame display section 134, a guidance display section 136, and a registration processing section 138. The input reception section 102 receives operation information from the user. The image acquisition section 104 acquires an image captured by the camera 7. The camera 7 captures a spatial image at predetermined intervals and captures, for example, a spatial image every 1/30 of a second, supplying the captured image to the image acquisition section 104. The captured image display section 132 displays, on the output device 4, a display, at least part of the image acquired by the image acquisition section 104. It should be noted that the captured image display section 132 should preferably display an enlarged view if part of the captured image is displayed.

In FIG. 4, each of the components described as a functional block adapted to handle various processes can be implemented, in terms of hardware, by a circuit block, a memory, or other LSI, and, in terms of software, for example, by a program loaded into a memory. Therefore, it is understood by those skilled in the art that these functional blocks can be implemented in various ways by hardware alone, software alone, or a combination thereof and that the present disclosure is not limited to any one of them.

The information processor 10 of the present embodiment is a stationary game console, with the camera 7 and the user separated by a distance of about several meters. Therefore, when a registered user logs in through face authentication, it is often probable that the face of the registered user does not directly face the camera 7. Even in such a case, the face authentication section 112 of the login controller 110 should preferably be able to determine whether the user included in the captured image is registered. That is, the face authentication section 112 should preferably be able to quickly perform the face authentication process even if the face of the registered user included in the captured image is slightly tilted or the orientation of the face is misaligned with the optical axis of the camera 7.

For this reason, the user information generator 130 registers face identification data, obtained during rotation of the user's face, in the registered user information retention section 120 in advance so that the login controller 110 can properly proceed with the face authentication process not only when the face of the registered user directly faces the camera 7 but also when the user's face is tilted relative to the camera 7 or when the orientation of the face is misaligned with the optical axis of the camera 7. As a result, it is not necessary for the user's face to directly face the camera 7, thus allowing him or her to quickly log into the information processor 10.

When the input reception section 102 receives a face registration request from the input device 6 of the user, the guidance display section 136 displays a face registration start screen on the output device 4. At this time, the registration processing section 138 identifies and retains the user account. When storing face identification data in the registered user information retention section 120 later, the registration processing section 138 registers the face identification data in association with the user account.

Figure 5A:
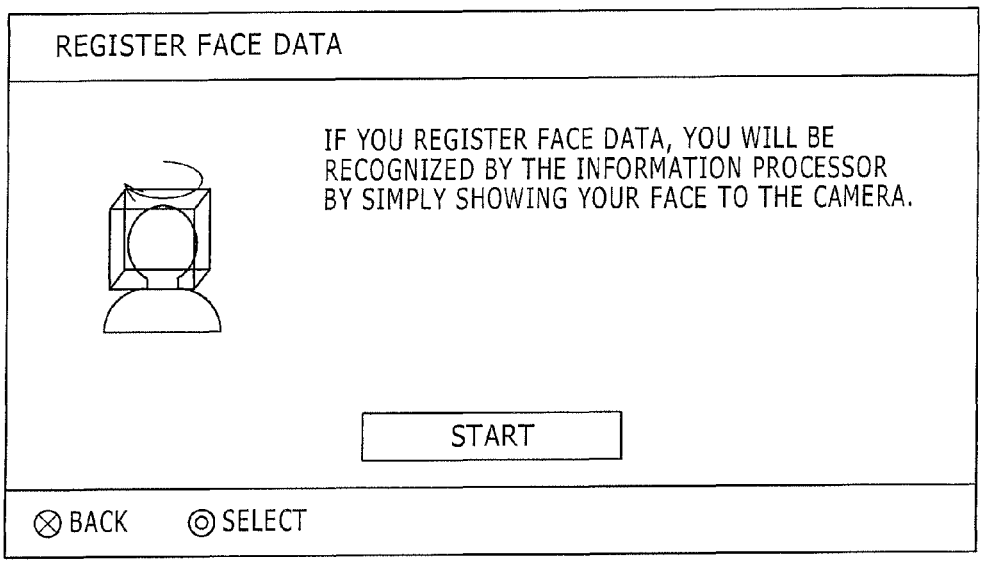
FIG. 5A is a diagram illustrating an example of a face registration start screen.
Figure 5B:
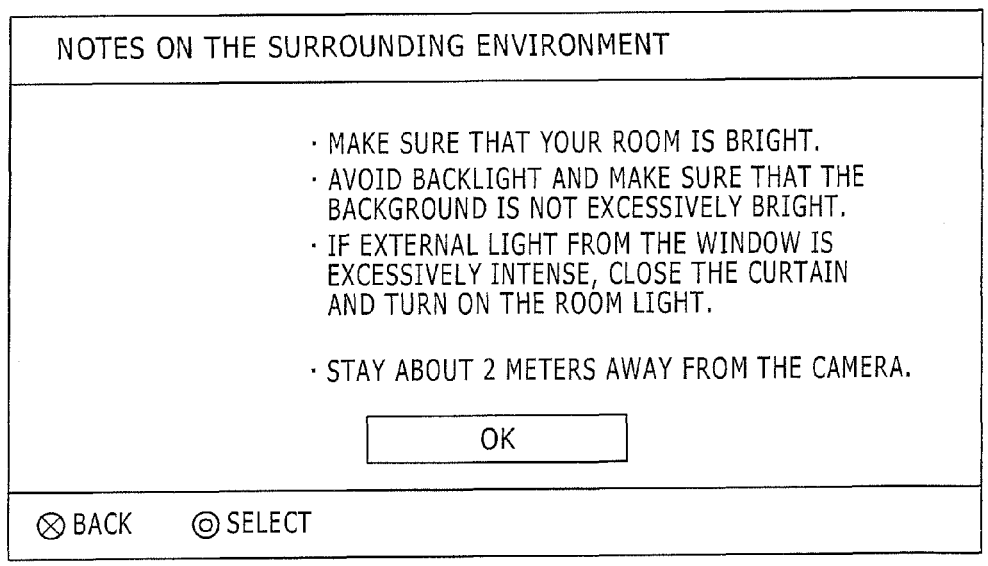
FIG. 5B is a diagram illustrating an example of an explanatory note about a surrounding environment.

FIG. 5A illustrates an example of a face registration start screen. When the user presses the Select button of the input device 6 while in the start screen, the input reception section 102 receives the selection operation, and the guidance display section 136 displays, on the output device 4, an explanatory note about a surrounding environment. FIG. 5B illustrates an example of an explanatory note about a surrounding environment. The user reads the note and creates an appropriate surrounding environment for face registration.

When the user presses the Select button of the input device 6 here, the input reception section 102 receives the selection operation, and the captured image display section 132 displays, on the output device 4, the image captured by the image acquisition section 104. As a result, the live image captured by the camera 7 appears on the output device 4, showing the user in front of the output device 4 on the same device 4.

Figure 6A:
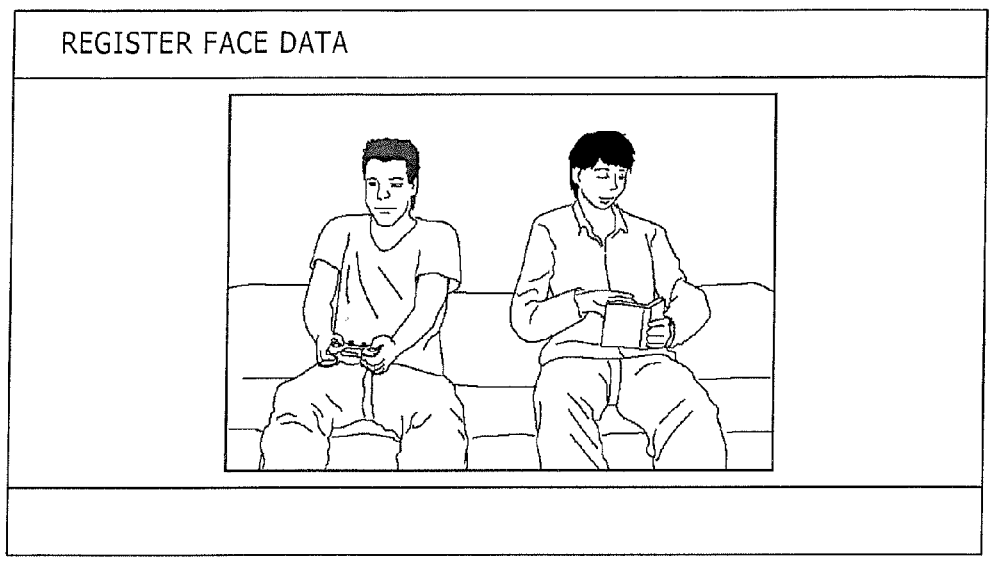
FIG. 6A is a diagram illustrating a live screen displayed on an output device.
Figure 6B:
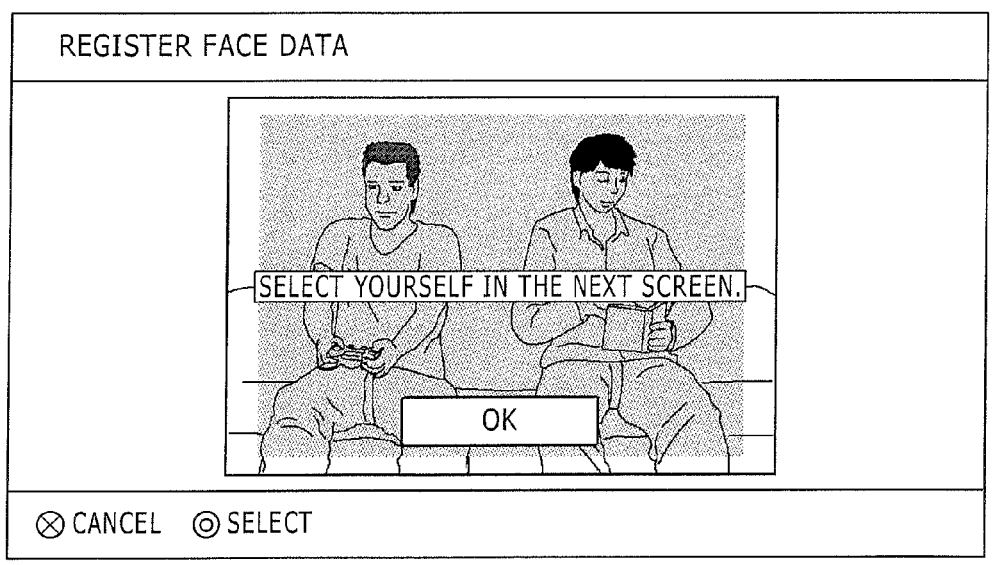
FIG. 6B is a diagram illustrating an example of a displayed message.

FIG. 6A illustrates a live screen displayed on the output device 4. Two users are included in the live screen. A user operates the input device 6 to register face identification data. When a given period of time (e.g., three seconds) elapses after the captured image display section 132 has displayed the live screen, the guidance display section 136 displays, to the user attempting to register his or her face, a message superimposed on the live screen. The message prompts the user to select his or her face. FIG. 6B illustrates an example of a displayed message. When the user presses the Select button of the input device 6, the input reception section 102 receives the selection operation, and the guidance display section 136 deletes the message from the screen.

Figure 7A:
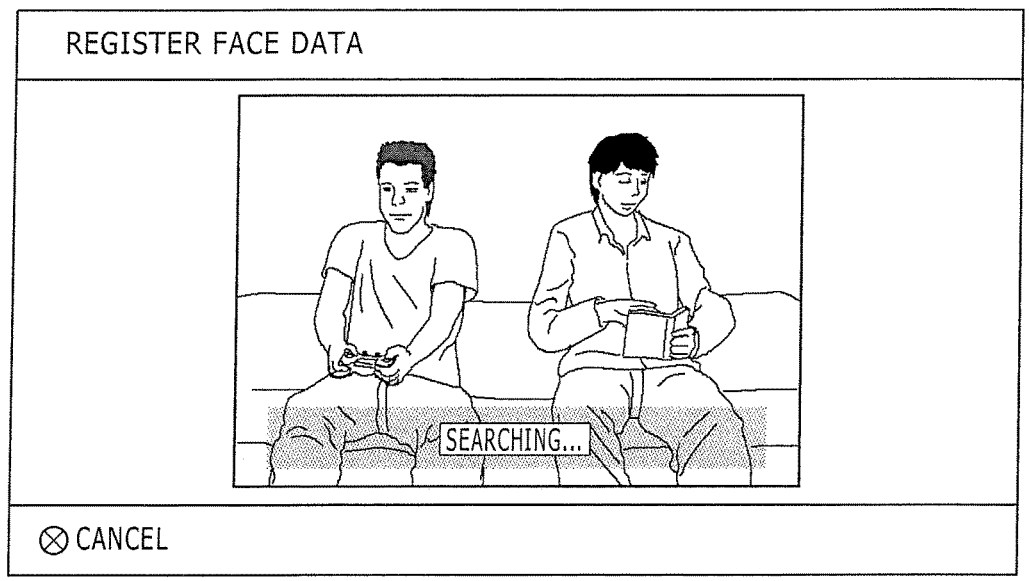
FIG. 7A is a diagram illustrating a face search execution screen.
Figure 7B:
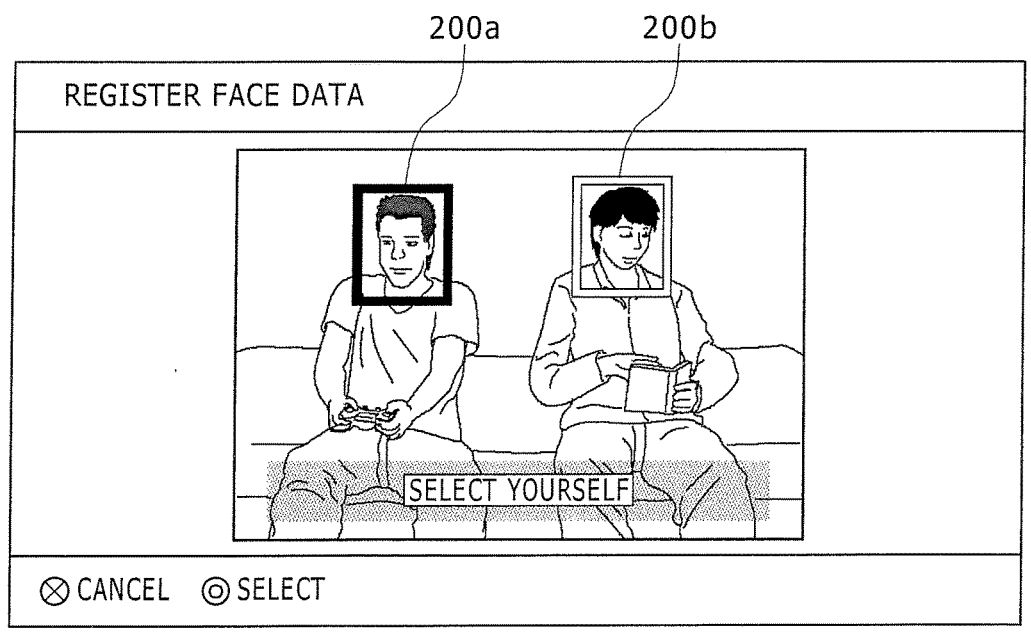
FIG. 7B is a diagram illustrating that users' face images are enclosed by face frames.

FIG. 7A illustrates a face search execution screen. The face authentication section 112 performs a face search process in the image captured by the camera 7, thus identifying the area which is likely a person's face (face area). Here, two users are included in the captured image. Therefore, the face authentication section 112 identifies two face areas. FIG. 7B is a diagram illustrating that users' face images are enclosed by face frames. After the face search process by the face authentication section 112 ends, the face frame display section 134 displays face frames 200a and 200b in such a manner as to enclose the identified user face areas. In FIG. 7B, the face frame 200a is shown as a black frame, and the face frame 200b as a white frame. Here, the black frame indicates that it is selected, and the white frame indicates that it is not selected. When the user operates the input device 6 to move to the right while in the screen shown in FIG. 7B, the black frame moves to the right, thus turning the color of the face frame 200b to black. When the user attempting to register his or her face turns the frame color of his or her own face to black and presses the Select button of the input device 6, the input reception section 102 receives the selection operation, and the guidance display section 136 displays guidance on the output device 4. The guidance provides information on how to rotate the face relative to the camera 7.

Figure 8:
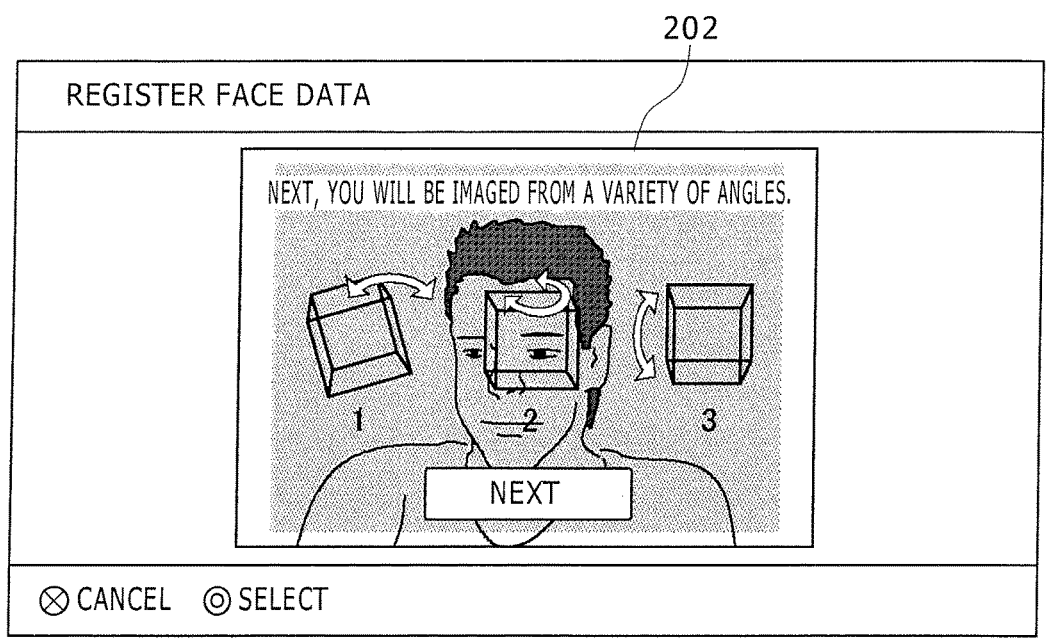
FIG. 8 is a diagram illustrating an explanatory screen describing the outline of face rotation performed by a user.

FIG. 8 illustrates an explanatory screen describing the outline of face rotation performed by the user. When the face frame 200a illustrated in FIG. 7B is selected by the user, the captured image display section 132 displays an enlarged view of the selected user's face area included in the captured image on the output device 4. This makes the user aware that the registration process of his or her face will begin from now. If two or more users are included in the captured image, the captured image display section 132 should preferably cut out a portion of the captured image so that only the selected user's face image appears on the output device 4. It should be noted that the enlarged user's face image should preferably be arranged at the center of the screen. The guidance display section 136 displays a guidance image 202 superimposed on the enlarged user's face image.

In the present embodiment, the user makes three kinds of face rotating motions in front of the camera 7 as illustrated by the guidance image 202. In each of these face rotating motions, the user directly faces the camera 7 as a basic posture and moves his or her face (his or her neck in reality) from the basic posture in accordance with guidance provided by the guidance display section 136. As a result, the registration processing section 138 registers user's face identification data in the registered user information retention section 120 in association with the user account based on the user's face image included in the captured image.

A description will be given below of three kinds of face rotating motions. In the description given below, the direction of the optical axis of the camera 7 will be referred to as the longitudinal direction. Further, the horizontal and vertical directions are specified with reference to the user's body.

The first motion is roll rotation. This is a rotating motion whose axis extends in the longitudinal direction. In roll rotation, the user tilts his or her neck to the left and right to make at least one to-and-fro motion within a given range of angles with his or her face facing the camera 7.

The second motion is yaw rotation. This is a rotating motion whose axis extends in the vertical direction. In yaw rotation, the user rotates his or her neck to the left and right to make at least one to-and-fro motion within a given range of angles.

The second motion is pitch rotation. This is a rotating motion whose axis extends in the horizontal direction. In pitch rotation, the user rotates his or her neck up and down to make at least one to-and-fro motion within a given range of angles.

The user watches the guidance screen illustrated in FIG. 8 and learns that he or she will make three kinds of face rotating motions. When the user presses the Select button of the input device 6, the input reception section 102 receives the selection operation, and the guidance display section 136 displays guidance on the output device 4. The guidance provides information on how to rotate the face relative to the camera 7.

As described above, the user moves his or her face in three different rotating directions in accordance with the guidance provided by the guidance display section 136 during the face registration process. Therefore, the guidance display section 136 displays one piece of guidance after another to help the user rotate the face in each direction. In the present embodiment, the guidance display section 136 displays guidance prompting the user to move the face in one rotating direction separately in demonstration and registration modes. Demonstration mode is designed to inform the user how he or she should move the neck. In this mode, guidance appears to show an object that repeatedly moves in one rotating direction within a given range of rotational angles. This object may be a three-dimensional object that matches the three-dimensional shape of the head (entire area above the neck). Alternatively, this object may be a two-dimensional object that matches the shape of the front face of the head.

Registration mode is designed to permit face registration by the user who has watched the guidance in demonstration mode as he or she actually moves the neck. The same guidance as in demonstration mode may be displayed. That is, in registration mode, the guidance appears to show a two- or three-dimensional object that makes a to-and-fro motion in one rotating direction within a given range of angles. The user moves his or her face to make a to-and-fro motion in one rotating direction within a given range of rotational angles in step with the motion of the object.

As described above, in demonstration and registration modes, the guidance display section 136 may display the same guidance to show a two- or three-dimensional object that makes a to-and-fro motion in a given rotating direction. However, the registration processing section 138 operates in a different manner. That is, the guidance in demonstration mode is designed to inform the user how he or she should move the face. In demonstration mode, therefore, the registration processing section 138 does not register face identification data. On the other hand, the guidance in registration mode is designed to support the user who watched the guidance in demonstration mode in actually moving his or her face. In registration mode, therefore, the registration processing section 138 registers face identification data.

It should be noted that the guidance display section 136 should preferably display the guidance in demonstration mode and that in registration mode in different manners. In particular, if the details of guidance or the guidance method in demonstration mode is the same as the details of guidance or the guidance method in registration mode, the guidance is displayed in different manners in the two modes. This makes the user become aware that it is only necessary for him or her to move the face after the manner of displaying the guidance changes.

The present inventor conducted a variety of user tests involving users having a duty to protect confidential information, and as a result, acquired statistical data indicating that if users are presented suddenly with guidance in registration mode without going through guidance in demonstration mode, it is difficult for them to become instantly aware of what they should do now, and many users have difficulty in rotating their faces. The present inventor has also learned that if guidance is switched from demonstration mode to registration mode in a step-by-step manner, many users can smoothly rotate their faces. In particular, the face registration process is performed when users register their new user accounts. Therefore, it is presumed that users are not accustomed to handling the information processor 10. For this reason, in the present embodiment, providing a user interface that displays the guidance in demonstration mode and that in registration mode is one of the key factors in implementing a smooth face registration process.

When the user presses the Select button of the input device 6 while in the guidance screen illustrated in FIG. 8, the input reception section 102 receives the selection operation, and the guidance display section 136 displays, on the output device 4, guidance prompting the user to rotate his or her face relative to the camera 7 in each rotating direction.

FIGS. 9A to 10B illustrate examples of screens used to guide the user to rotate his or her face in roll. In these screen examples, guidance appears so that the user can move his or her face in the rotating direction whose axis extends in the longitudinal direction.

Figure 9A:
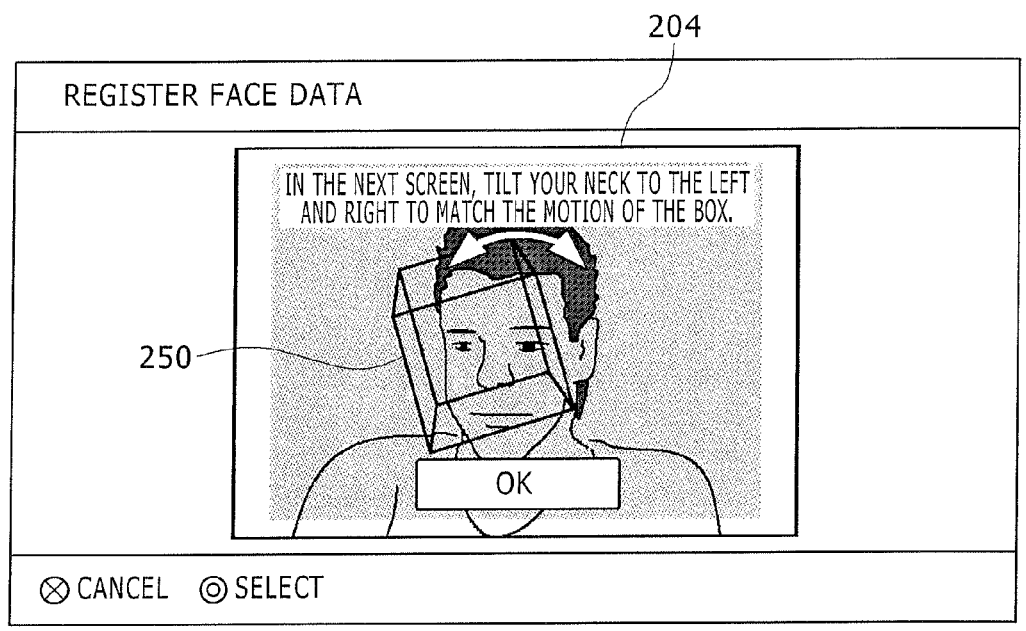
FIGS. 9A and 9B are diagrams illustrating guidance screens in demonstration mode about roll rotation.
Figure 9B:
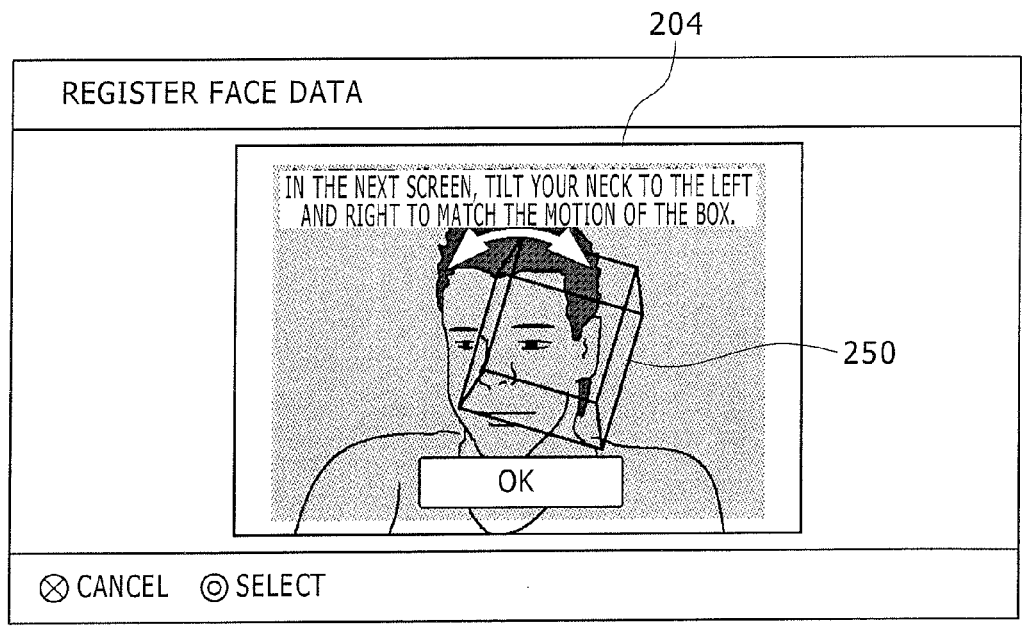

FIGS. 9A and 9B illustrate guidance screens in demonstration mode about roll rotation. The guidance display section 136 displays, on the output device 4, a guidance image 204 that shows a three-dimensional box 250. The same box 250 makes a to-and-fro motion in the rotating direction whose axis extends in the longitudinal direction. The guidance image 204 displays a movie in which the box 250 rotates in roll to the left and right slowly. The guidance display section 136 determines the size of the box 250 in accordance with the size of the user's face image on the output device 4. For example, the guidance display section 136 may set the size of the box 250 slightly smaller than the size of the user's face image. As a result, the size of the box 250 varies from one user to another. Even for the same user, the size of the box 250 varies depending on the distance to the camera 7.

Further, the guidance display section 136 displays, on the output device 4, the box 250 with reference to the position of the user's face image on the output device 4. As described earlier, first of all, the user has a posture in which his or her face directly faces the camera 7 during the face image registration process. The captured image display section 132 displays, on the output device 4, part of the captured image so that the user's face image directly facing the camera 7 is located at the center on the output device 4. The guidance display section 136 displays the box 250 with reference to the position of the user's face image that directly faces the camera 7 so that the box 250 continuously rotates in roll to the left and right from that reference position. It should be noted that the box 250 is an example of a three-dimensional object, and that a three-dimensional model of a head may be displayed. Alternatively, a two-dimensional object may be displayed in the guidance image 204 as described above. In demonstration mode, the guidance image 204 appears with a background color different from the color of the captured image to make it clear that an explanatory screen is being displayed. When the user presses the Select button of the input device 6, the input reception section 102 receives the selection operation, and the guidance display section 136 switches the guidance image in demonstration mode to that in registration mode.

Figure 10A:
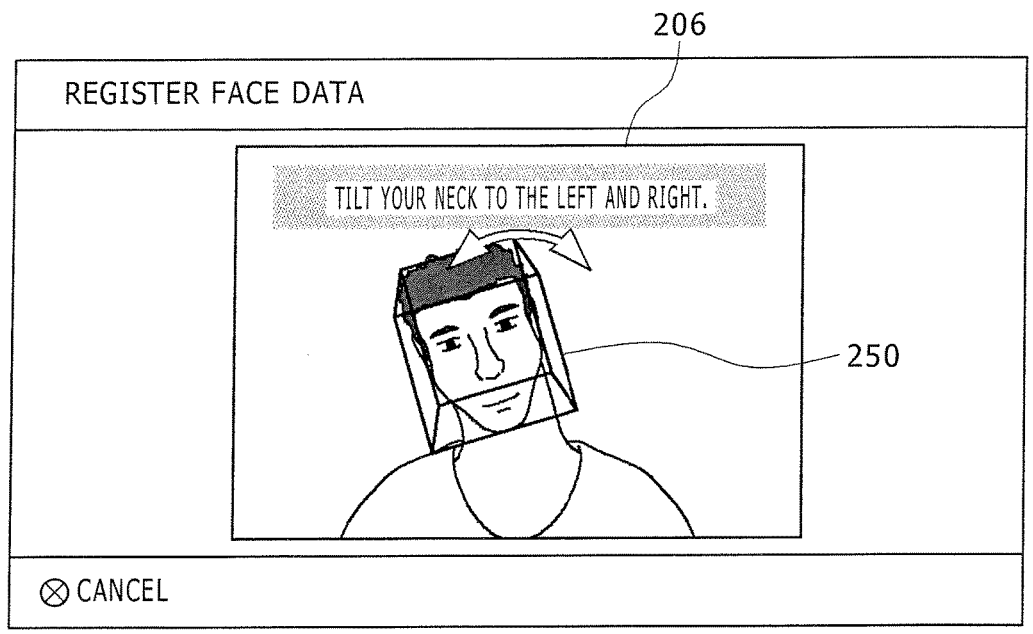
FIGS. 10A and 10B are diagrams illustrating guidance screens in registration mode about roll rotation.
Figure 10B:
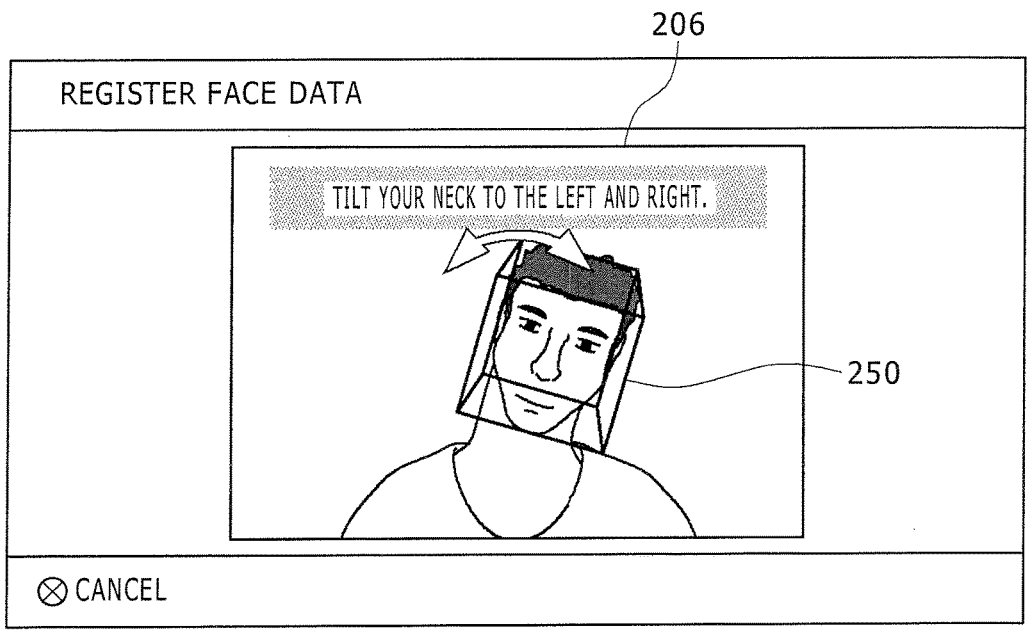

FIGS. 10A and 10B illustrate guidance screens in registration mode about roll rotation. The guidance display section 136 displays, on the output device 4, a guidance image 206 that shows the three-dimensional box 250. The same box 250 makes a to-and-fro motion in the rotating direction whose axis extends in the longitudinal direction. The guidance display section 136 may move the box 250 in demonstration mode illustrated in FIGS. 9A and 9B and the box 250 in registration mode illustrated in FIGS. 10A and 10B in the same manner. It should be noted that the guidance display section 136 does not display, in registration mode, the background color of the guidance image that is displayed in demonstration mode. As described above, the guidance display section 136 displays the guidance in demonstration mode and that in registration mode in different manners, thus allowing the user to readily recognize the guidance display mode.

The guidance image 206 displays a movie in which the box 250 rotates in roll to the left and right slowly. The user who learned the motion in demonstration mode understands what he or she should do in the guidance screen in registration mode, tilting the neck to the left and right in step with the motion of the box 250.

The registration processing section 138 registers face identification data based on the user's face image included in the captured image that appears in the guidance in registration mode. Here, the user tilts his or her neck to the left and right while the box 250 illustrated in FIGS. 10A and 10B appears. The registration processing section 138 generates face identification data based not only on the face image at the position where the face is directly facing the camera 7 but also that at the position where the face is diagonally tilted at a given angle, registering the generated data in the registered user information retention section 120. It should be noted that this angle may be, for example, positive and negative 15 degrees. Face identification data may be registered in the registered user information retention section 120 after face identification data in all other rotating directions has been generated. After generating face identification data of the face image tilted at a given angle, the registration processing section 138 notifies the guidance display section 136 that the face identification data generation process is complete. It should be noted that the guidance display section 136 continues to move the box 250 in the captured image until a completion notice is received.

Upon receipt of a completion notice, the guidance display section 136 displays, on the output device 4, guidance prompting the user to rotate his or her face in yaw.

FIGS. 11A to 12B illustrate examples of screens used to guide the user to rotate his or her face in yaw. In these screen examples, the guidance appears to prompt the user to move his or her face in the rotating direction whose axis extends in the vertical direction.

Figure 11A:
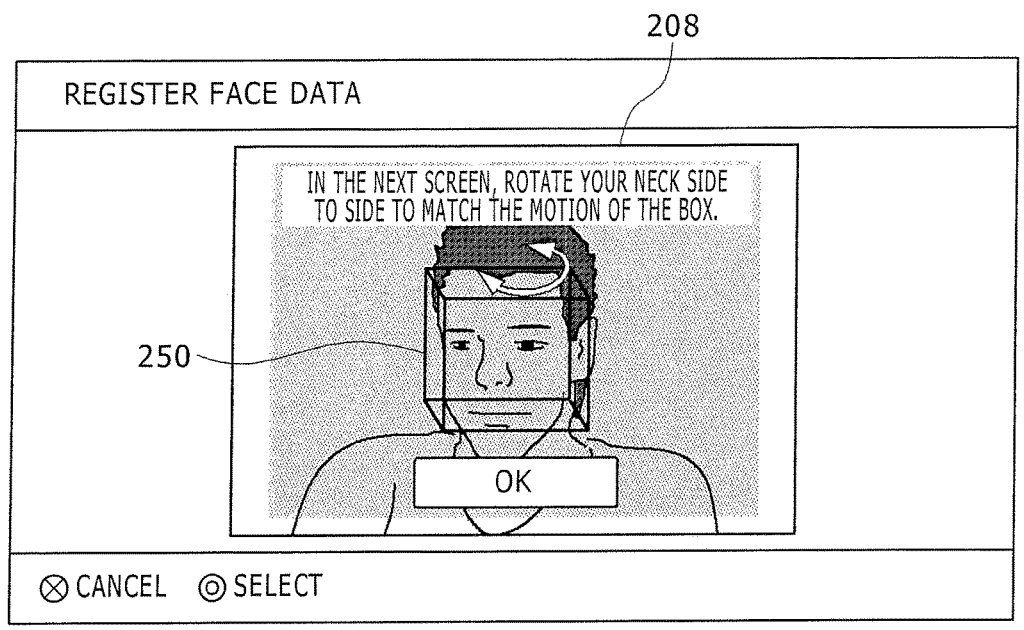
FIGS. 11A and 11B are diagrams illustrating guidance screens in demonstration mode about yaw rotation.
Figure 11B:
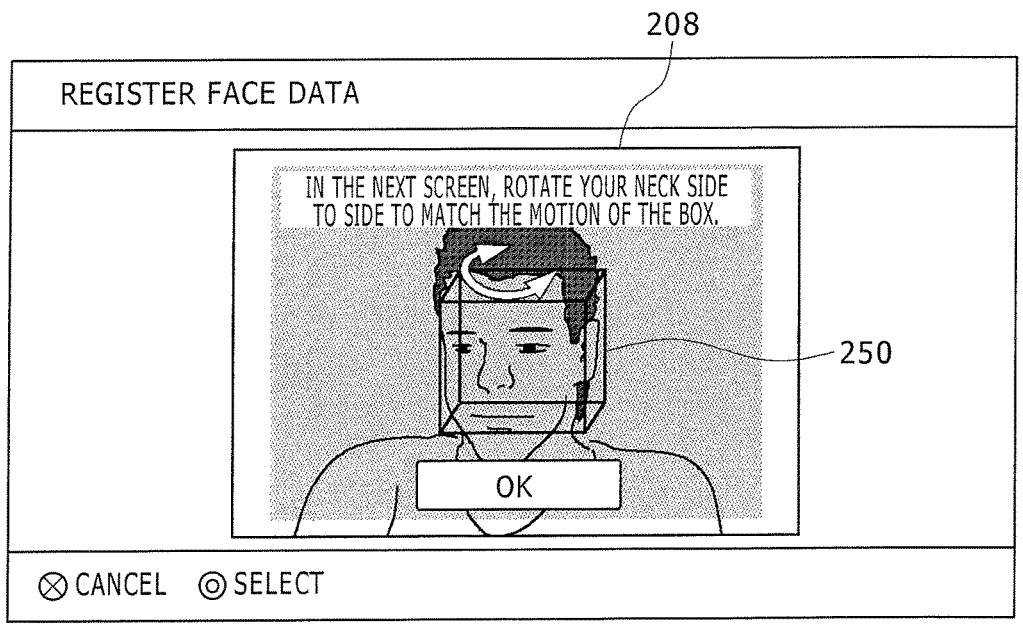

FIGS. 11A and 11B illustrate guidance screens in demonstration mode about yaw rotation. The guidance display section 136 displays, on the output device 4, a guidance image 208 that shows the three-dimensional box 250. The same box 250 makes a to-and-fro motion in the rotating direction whose axis extends in the vertical direction. The guidance image 208 displays a movie in which the box 250 rotates in yaw to the left and right slowly.

The guidance display section 136 displays, on the output device 4, the box 250 with reference to the position of the user's face image on the output device 4. More specifically, the guidance display section 136 displays the box 250 with reference to the position of the user's face image that directly faces the camera 7 so that the box 250 continuously rotates in yaw to the left and right from that reference position. In demonstration mode, the guidance image 208 appears with a background color different from the color of the captured image to make it clear that an explanatory screen is being displayed. When the user presses the Select button of the input device 6, the input reception section 102 receives the selection operation, and the guidance display section 136 switches the guidance image in demonstration mode to that in registration mode.

Figure 12A:
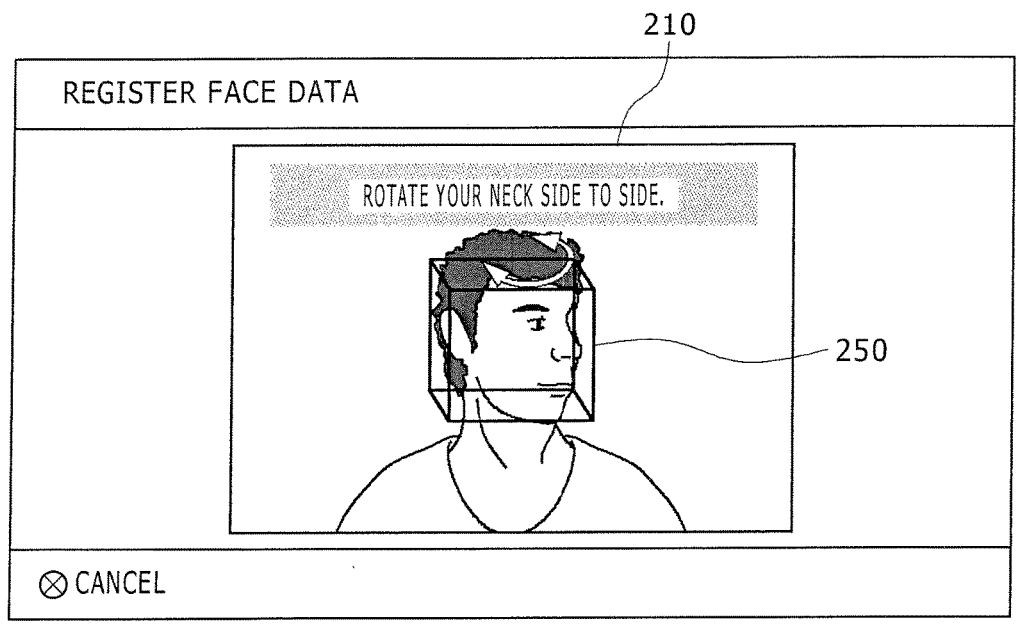
FIGS. 12A and 12B are diagrams illustrating guidance screens in registration mode about yaw rotation.
Figure 12B:
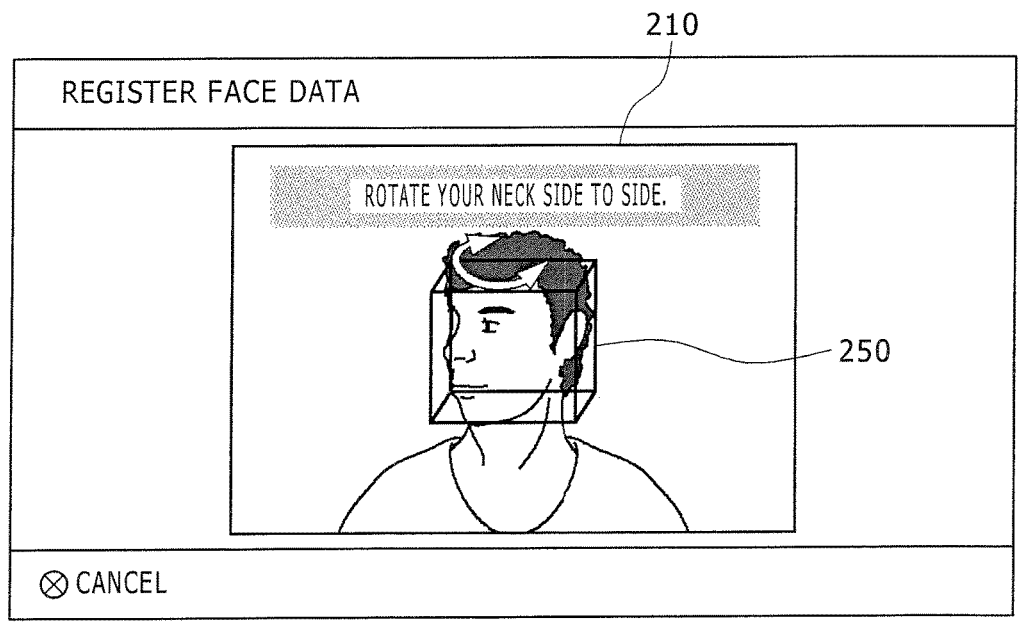

FIGS. 12A and 12B illustrate guidance screens in registration mode about yaw rotation. The guidance display section 136 displays, on the output device 4, a guidance image 210 that shows the three-dimensional box 250. The same box 250 makes a to-and-fro motion in the rotating direction whose axis extends in the vertical direction. The guidance display section 136 may move the box 250 in demonstration mode illustrated in FIGS. 11A and 11B and the box 250 in registration mode illustrated in FIGS. 12A and 12B in the same manner. It should be noted that the guidance display section 136 does not display, in registration mode, the background color of the guidance image that is displayed in demonstration mode. As described above, the guidance display section 136 displays the guidance in demonstration mode and that in registration mode in different manners, thus allowing the user to readily recognize the guidance display mode.

The guidance image 210 displays a movie in which the box 250 rotates in yaw to the left and right slowly. The user who learned the motion in demonstration mode understands what he or she should do in the guidance screen in registration mode, rotating the neck to the left and right in step with the motion of the box 250.

The registration processing section 138 registers face identification data based on the user's face image included in the captured image that appears in the guidance in registration mode. Here, the user rotates his or her neck to the left and right while the box 250 illustrated in FIGS. 12A and 12B appears. The registration processing section 138 generates face identification data based not only on the face image at the position where the face is directly facing the camera 7 but also that at the position where the face is tilted to the left and right at a given angle, registering the generated data in the registered user information retention section 120. It should be noted that the face image at the position where the face is directly facing the camera 7 has already been acquired during roll rotation. Therefore, the generation of face identification data may be omitted. Face identification data may be registered in the registered user information retention section 120 after face identification data in all other rotating directions has been generated. After generating face identification data of the face image tilted at a given angle, the registration processing section 138 notifies the guidance display section 136 that the face identification data generation process is complete. It should be noted that the guidance display section 136 continues to move the box 250 in the captured image until a completion notice is received.

Upon receipt of a completion notice, the guidance display section 136 displays, on the output device 4, guidance prompting the user to rotate his or her face in pitch.

FIGS. 13A to 14B illustrate examples of screens used to guide the user to rotate his or her face in pitch. In these screen examples, the guidance appears to prompt the user to move his or her face in the rotating direction whose axis extends in the horizontal direction.

Figure 13A:
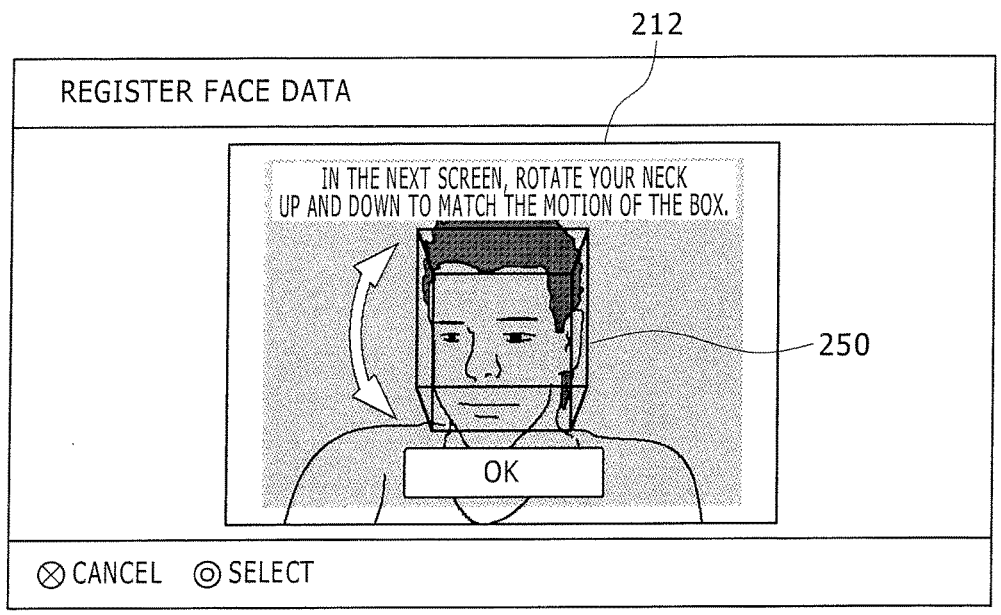
FIGS. 13A and 13B are diagrams illustrating guidance screens in demonstration mode about pitch rotation.
Figure 13B:
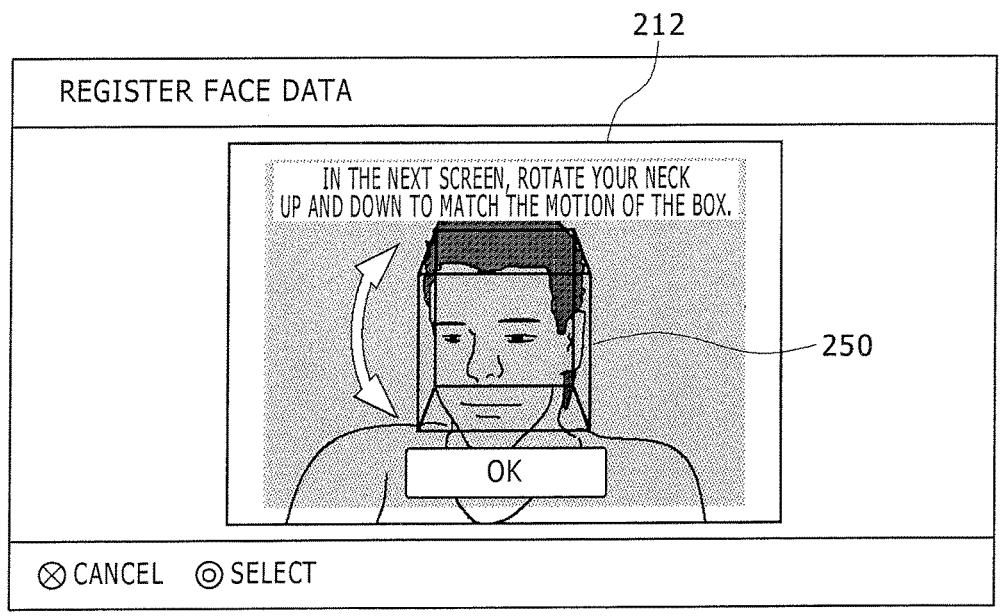

FIGS. 13A and 13B illustrate guidance screens in demonstration mode about pitch rotation. The guidance display section 136 displays, on the output device 4, a guidance image 212 that shows the three-dimensional box 250. The same box 250 makes a to-and-fro motion in the rotating direction whose axis extends in the horizontal direction. The guidance image 212 displays a movie in which the box 250 rotates in pitch up and down slowly.

The guidance display section 136 displays, on the output device 4, the box 250 with reference to the position of the user's face image on the output device 4. More specifically, the guidance display section 136 displays the box 250 with reference to the position of the user's face image that directly faces the camera 7 so that the box 250 continuously rotates in pitch up and down from that reference position. In demonstration mode, the guidance image 212 appears with a background color different from the color of the captured image to make it clear that an explanatory screen is being displayed. When the user presses the Select button of the input device 6, the input reception section 102 receives the selection operation, and the guidance display section 136 switches the guidance image in demonstration mode to that in registration mode.

Figure 14A:
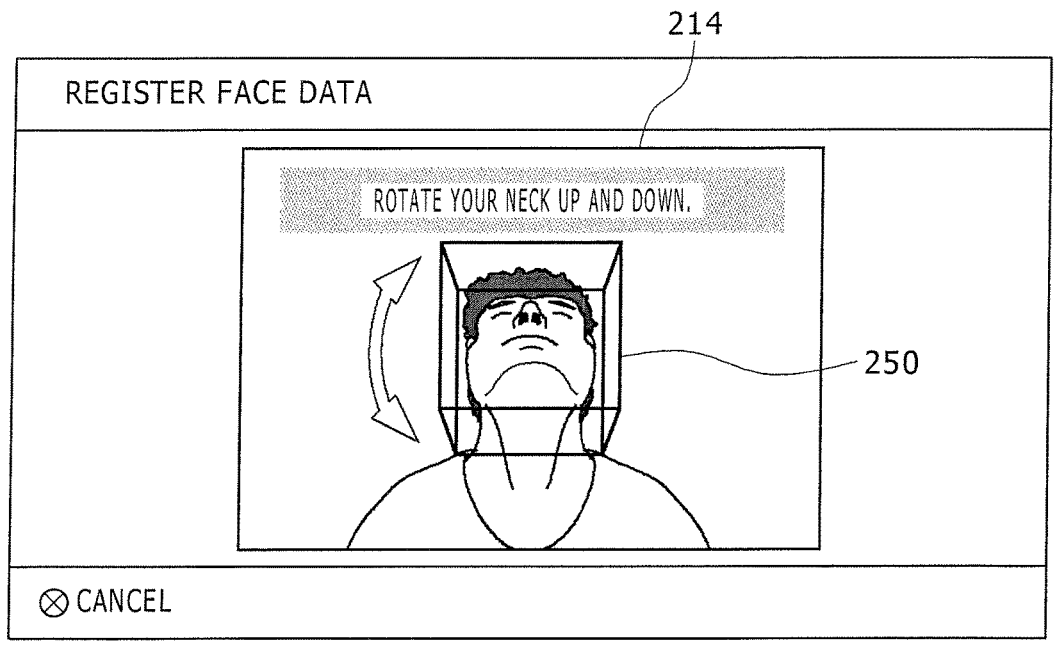
FIGS. 14A and 14B are diagrams illustrating guidance screens in registration mode about pitch rotation.
Figure 14B:
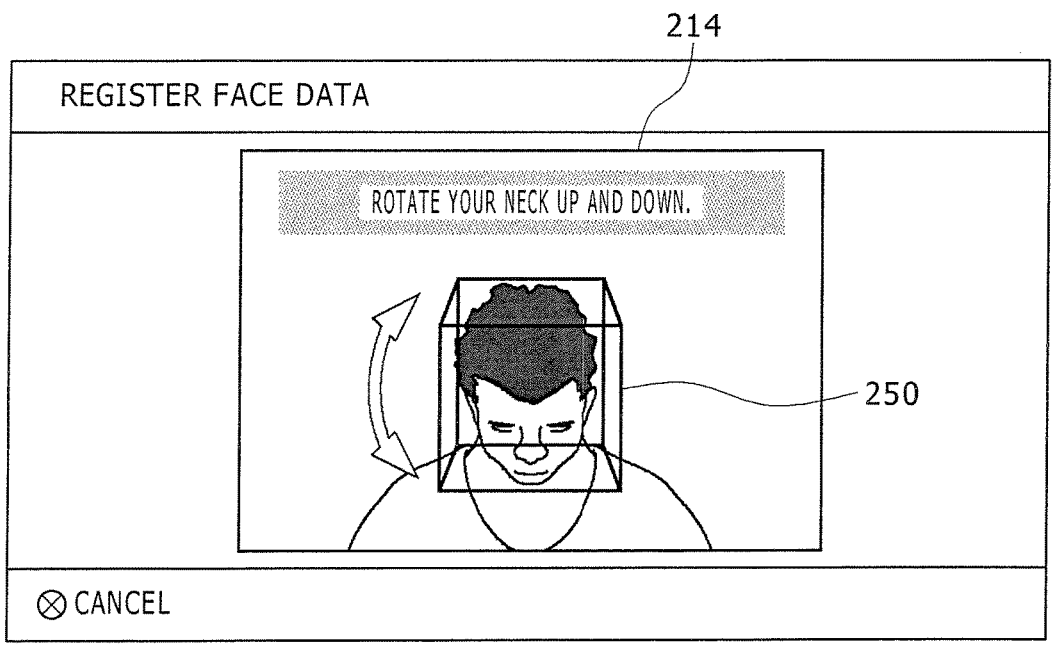

FIGS. 14A and 14B illustrate guidance screens in registration mode about pitch rotation. The guidance display section 136 displays, on the output device 4, a guidance image 214 that shows the three-dimensional box 250. The same box 250 makes a to-and-fro motion in the rotating direction whose axis extends in the horizontal direction. The guidance display section 136 may move the box 250 in demonstration mode illustrated in FIGS. 13A and 13B and the box 250 in registration mode illustrated in FIGS. 14A and 14B in the same manner. It should be noted that the guidance display section 136 does not display, in registration mode, the background color of the guidance image that is displayed in demonstration mode. As described above, the guidance display section 136 displays the guidance in demonstration mode and that in registration mode in different manners, thus allowing the user to readily recognize the guidance display mode.

The guidance image 214 displays a movie in which the box 250 rotates in pitch up and down slowly. The user who learned the motion in demonstration mode understands what he or she should do in the guidance screen in registration mode, rotating the neck up and down in step with the motion of the box 250.

The registration processing section 138 registers face identification data based on the user's face image included in the captured image that appears in the guidance in registration mode. Here, the user rotates his or her neck up and down while the box 250 illustrated in FIGS. 14A and 14B appears. The registration processing section 138 generates face identification data based not only on the face image at the position where the face is directly facing the camera 7 but also that at the position where the face is tilted up and down at a given angle, registering the generated data in the registered user information retention section 120. It should be noted that the face image at the position where the face is directly facing the camera 7 has already been acquired during roll rotation. Therefore, the generation of face identification data may be omitted. After generating face identification data of the face image tilted at a given angle, the registration processing section 138 notifies the guidance display section 136 that the face identification data generation process is complete. It should be noted that the guidance display section 136 continues to move the box 250 in the captured image until a completion notice is received.

Upon receipt of a completion notice, the guidance display section 136 displays, on the output device 4, the completion of the face registration process. FIG. 15 illustrates an end screen of the face registration process. When the user presses the Select button of the input device 6, the face registration process ends. As described above, the registration processing section 138 can register, in the registered user information retention section 120, face identification data acquired from a variety of angles as the user moves his or her face in three different rotating directions. This allows the login controller 110 to provide improved accuracy in user face authentication, thus implementing a simple and easy login operation for the user.

The present disclosure has been described above based on an embodiment. It should be understood by those skilled in the art that the above embodiment is illustrative, that the combination of components and processes can be modified in various ways, and that such modification examples also fall within the scope of the present disclosure. In the embodiment, a case has been described in which the guidance display section 136 provides guidance using the box 250, a three-dimensional object. However, guidance may be provided, for example, by an explanatory note in text form. It should be noted that using the box 250 ensures better user comprehension as described above.

In the embodiment, a case has been described in which the guidance display section 136 displays, on the output device 4, guidance prompting the user to rotate his or her face relative to the camera 7 in three rotating directions. However, it is not typically necessary to display guidance for all rotating directions. It is only necessary for the guidance display section 136 to display guidance for one rotating direction. However, it is possible to register, in the registered user information retention section 120, face identification data at various angles by displaying guidance for at least two rotating directions. Further, in the embodiment, a case has been described in which the guidance display section 136 displays, on a display, guidance prompting the user to rotate his or her face relative to the camera 7 in a condition where the user is directly facing the fixed camera 7. However, the camera 7 may be, for example, a portable camera, and the guidance display section 136 may display, on a display, guidance so that the user's face can be captured at a variety of angles by moving the camera 7 around the face. The camera 7 may be integral with the display. Alternatively, the camera 7 may be integral with the display and the information processor 10.

Further, in the embodiment, a case has been described in which the registration processing section 138 does not generate face identification data while the guidance display section 136 displays the box 250 in demonstration mode. However, the registration processing section 138 may generate face identification data also in demonstration mode. Some users move their faces in step with the motion of the box 250 even in demonstration mode. What counts is that the registration processing section 138 generates face identification data of face images at desired angles regardless of the mode, i.e., demonstration or registration mode. Therefore, the registration processing section 138 may generate face identification data regardless of the display mode.

Still further, in the embodiment, a case has been described in which the guidance display section 136 moves the box 250 in demonstration mode and in registration mode in the same manner. However, the guidance display section 136 may not display the box 250 in registration mode. Because the user is aware of the kind of motion he or she should make after having watched the guidance in demonstration mode, the guidance display section 136 may not display the guidance after the end of the demonstration mode. In this case, therefore, the registration processing section 138 registers, in the registered user information retention section 120, face identification data based on the user's face image included in the captured image after the guidance in demonstration mode has been displayed.

It should be noted that the registration processing section 138 may generate face identification data of the user's face image and register the data in the registered user information retention section 120 when the user logs in through face authentication. For example, if the user's hairstyle has changed, it is possible to provide improved accuracy in user face authentication handled by the login controller 110 if various face identification data is registered in the registered user information retention section 120.

The present disclosure contains subject matter related to that disclosed in Japanese Priority Patent Application JP 2013-231103 filed in the Japan Patent Office on Nov. 7, 2013, the entire content of which is hereby incorporated by reference.

What is claimed is:

1. An information processing device configured to register user face identification data, the information processing device comprising:

a processor;
an imaging device;
a display;
a captured image display section adapted to display part of a captured image from the imaging device on the display;
a guidance display section adapted to display, on the display, guidance prompting a user to rotate his or her face relative to the imaging device; and
a registration processing section adapted to register, using the processor, face identification data based on user's face image included in the captured image after or while the guidance is displayed,
wherein the registration processing section requires the user to move the user's face in step with a motion of the guidance and
wherein the guidance is displayed until a completion notice is received.

2. The information processing device of claim 1, wherein the captured image display section displays, on the display, an enlarged view of the user's face area included in the captured image.

3. The information processing device of claim 1, wherein the guidance display section displays, on the display, first guidance prompting the user to move his or her face in a first rotating direction and second guidance prompting the user to move his or her face in a second rotating direction, and the registration processing section registers first face identification data based on a face image obtained by moving the user's face in the first rotating direction after or while the first guidance is displayed, and the registration processing section registers second face identification data based on a face image obtained by moving the user's face in the second rotating direction after or while the second guidance is displayed.

4. The information processing device of claim 1, wherein the guidance display section displays guidance showing a two- or three-dimensional object that moves in a given rotating direction.

5. The information processing device of claim 4, wherein the guidance display section determines the size of the object in accordance with the size of the user's face image on the display.

6. The information processing device of claim 4, wherein the guidance display section displays, on the display, the object with reference to the position of the user's face image on the display.

7. The information processing device of claim 1, wherein the guidance display section displays guidance prompting the user to move the face in one rotating direction separately in demonstration and registration modes, and the registration processing section does not register face identification data in demonstration mode but registers face identification data in registration mode.

8. The information processing device of claim 7, wherein the guidance display section displays the guidance in demonstration mode and the guidance in registration mode in different manners.

9. A method for registering a user on an image processing device, the method comprising:

displaying part of a captured image on a display of the image processing device;
displaying, on the display, guidance prompting the user to rotate his or her face relative to an imaging device; and
registering face identification data based on user's face image included in the captured image after or while the guidance is displayed wherein the registering requires the user to move the user's face in step with a motion of the guidance and the guidance is displayed until a completion notice is received.

10. A non-transitory computer-readable recording medium storing a program for a computer, the program including:

displaying part of a captured image on a display, displaying, on the display, guidance prompting a user to rotate his or her face relative to an imaging device, and registering face identification data based on user's face image included in the captured image after or while the guidance is displayed wherein the registering requires the user to move the user's face in step with a motion of the guidance, and the guidance is displayed until a completion notice is received.

* * * * *